United States Patent [19]

Wagensonner et al.

[11] 4,192,588
[45] * Mar. 11, 1980

[54] CONTROL SYSTEM FOR CONTROLLING THE DIAPHRAGM IN A PHOTOGRAPHIC CAMERA

[75] Inventors: Eduard Wagensonner, Aschheim; Alois Rieder, Münich; Bernhard von Fischern, Ottobrunn, all of Fed. Rep. of Germany

[73] Assignee: AGFA-Gevaert, A.G., Leverkusen, Fed. Rep. of Germany

[*] Notice: The portion of the term of this patent subsequent to Mar. 14, 1995, has been disclaimed.

[21] Appl. No.: 835,854

[22] Filed: Sep. 20, 1977

Related U.S. Application Data

[63] Continuation of Ser. No. 629,546, Nov. 6, 1975, Pat. No. 4,079,391.

[30] Foreign Application Priority Data

Nov. 9, 1974 [DE] Fed. Rep. of Germany ....... 2453285

[51] Int. Cl.² .............................................. G03B 7/08
[52] U.S. Cl. ........................................ 354/43; 354/44; 352/141
[58] Field of Search ................... 354/43, 44; 352/141

[56] References Cited

U.S. PATENT DOCUMENTS

| | | | |
|---|---|---|---|
| 3,430,053 | 2/1969 | Westhaver | 354/43 |
| 3,813,680 | 5/1974 | Wagensonner et al. | 354/44 |
| 3,882,522 | 5/1975 | Erlichman | 354/43 |
| 3,958,256 | 5/1976 | Wagensonner et al. | 354/44 |
| 3,972,607 | 8/1976 | Reider | 354/44 |
| 3,987,462 | 10/1976 | Wagensonner | 354/44 |

Primary Examiner—Russell E. Adams
Attorney, Agent, or Firm—Michael J. Striker

[57] ABSTRACT

The output of a bridge circuit which is unbalanced when the quantity of light falling on a light-sensitive element is less than or more than a predetermined light quantity is applied to a differential amplifier circuit whose output varies from a minimum amplitude to a maximum amplitude. The output of the differential amplifier is connected to a first and second threshold circuit whose threshold values are symmetrical to the output value of the differential amplifier when the bridge is in balance. The gain of the differential amplifier is adjusted so that the differential output signal has an amplitude exceeding the first threshold value and less than the second threshold value for variations of light within an allowable range. Within this range the first threshold circuit furnishes an output signal and the second threshold circuit does not. When the first threshold circuit does not furnish an output signal or if the second threshold circuit does, a pulse generator is energized whose pulses are counted by a counter which is controlled to energize the windings of the stepmotor controlling the diaphragm aperture in pairs in a predetermined sequence for opening and the reverse sequence for closing the diaphargm. The operation of the pulse generator and thereby of the motor is impeded when a switch furnishes a signal indicating that the diaphragm is fully open.

3 Claims, 4 Drawing Figures

CONTROL SYSTEM FOR CONTROLLING THE DIAPHRAGM IN A PHOTOGRAPHIC CAMERA

This is a continuation, of application Ser. No. 629,546, filed Nov. 6, 1975, now U.S. Pat. No. 4,079,391.

BACKGROUND OF THE INVENTION

The present invention relates to control arrangements for photographic apparatus and in particular for motion picture cameras. In these cameras a bridge circuit is present which comprises at least one light-sensitive element. Further, a differential amplifier has its two inputs connected to the bridge circuit output and has an output connected to an electromagnetic adjustment means which controls the opening in the diaphragm in such a manner as to balance the bridge circuit. In order to accomplish this, the differential amplifier is followed by a first and second threshold circuit. The electromagnetic adjustment means adjusting the diaphragm opening are energized to operate in a first direction when the first threshold circuit does not furnish an output signal and in a second direction when the second threshold circuit does furnish an output signal.

SUMMARY OF THE INVENTION

It is an object of the present invention to furnish a control arrangement of the above-described type in which an oscillation of the electromagnetic adjustment means about the final adjusted value is prevented.

It is a further object of the present invention to furnish a system of the above-described type wherein the operation of the electromagnetic adjustment means operating the diaphragm is prevented if the diaphragm is in an extreme position such as the extreme open position.

It is a further object of the present invention to furnish an above-described system in which the power consumption is decreased.

In accordance with the present invention, the gain of differential amplifier circuit is adjusted relative to the threshold values of the first and second threshold circuit in such a manner that the amplitude of the differential output signal varies between a first value barely exceeding the threshold value of the first threshold circuit and a second amplitude just below the threshold value of the second threshold circuit for variations in the bridge output signal indicative of a permissible variation of light falling on the light-sensitive element. In particular the permissible light variation may be the light variation corresponding to one f-stop. Oscillations about the balance position are thus prevented in that a predetermined light variation must first occur before the system responds.

In a preferred embodiment of the present invention the threshold circuits are connected to energizing means which energize windings of the electromagnetic adjustment means in predetermined sequences for opening and closing the diaphragm respectively. In a preferred embodiment of the present invention the energizing means comprise logic circuit means connected to the first and second threshold circuit means for furnishing a logic output signal in the absence of the first threshold output signal or the presence of the second output signal. The energizing means further comprise pulse generator means connected to the logic circuit means for furnishing a sequence of pulses in response to the logic output signal. Counting means are provided which count the pulses in the sequence of pulses. The counting means have a plurality of counting outputs. Each counting output signal, corresponding to the number of so-counted pulses, is represented by two energized outputs and two deenergized outputs. Each of the windings of the electromagnetic adjusting means is connected to the emitter-collector circuit of a transistor whose base is connected to one of the above-mentioned counting outputs. Further, additional transistors are provided which cause all of the first-mentioned transistors to be in the blocked state in the absence of the pulses of the pulse sequence. Thus none of the windings of the electromagnetic adjustment means, which in a preferred embodiment of the present invention comprise a stepmotor, is energized when the circuit is in balance.

In a further preferred embodiment of the present invention, a switch is provided which is coupled to the diaphragm such that it closes when the diaphragm is in the fully open position. The signal generated upon closing of the switch is applied through additional logic circuit means to block the operation of the first-mentioned logic circuit means in the absence of the first threshold output signal. Any damage to the diaphragm which might result through the application of forces to the diaphragm which attempt to open it beyond its fully open position is thus prevented. If the surrounding brightness now increases so that the diaphragm opening is again to be decreased, the switch is again opened, the motor will again be energized, this time by the second threshold output signal, and the blocking by the switch will be removed.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
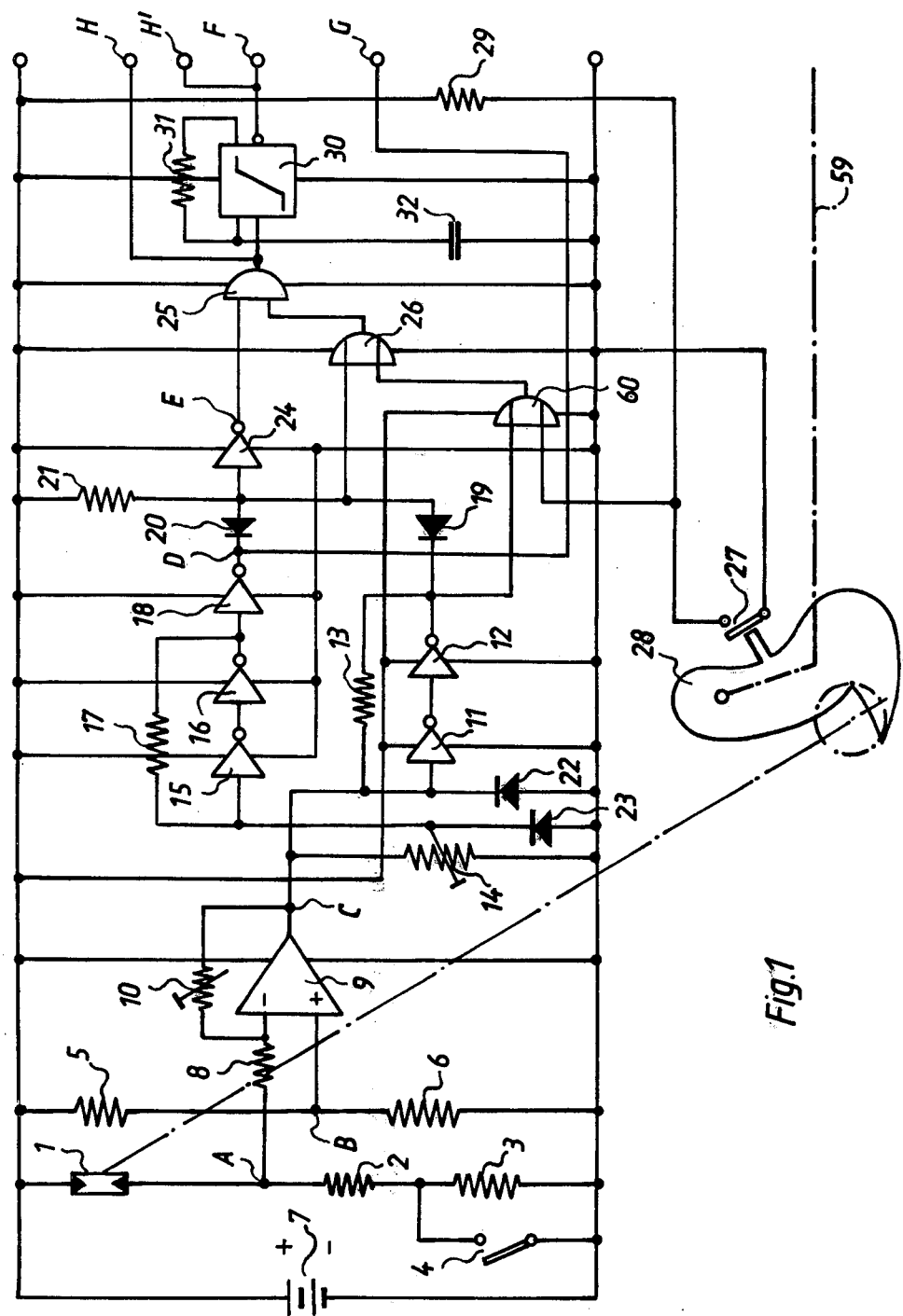
FIGS. 1 and 2 show a first embodiment of the present invention.

A preferred embodiment of the present invention will now be described with reference to the drawing.

As shown in FIG. 1, a bridge circuit comprises a first voltage divider including a light-sensitive element (photoresistor) 1 and two resistors 2 and 3. Resistor 3 is shunted by a switch 4. Further, the bridge circuit comprises a second voltage divider including a resistor 5 and a resistor 6. A battery supply is denoted by reference numeral 7. A bridge output signal is furnished between two terminals A and B. A is connected through a resistor 8 to the inverting input of a differential amplifier 9, while terminal B is connected to the direct input of this differential amplifier. The differential amplifier output which furnishes the differential output signal is denoted by reference numeral C. The signal from terminal A to terminal B is herein referred to as the bridge unbalance signal. The gain of amplifier 9 is adjustable by means of a resistor 10 connected from its output to the inverting input. The differential amplifier output C is connected to a first threshold stage comprising two cascaded inverter stages 11 and 12 and a feedback resistor 13. Further, a potentiometer 14 is connected from terminal C to the negative side of battery 7. The wiper arm of potentiometer 14 is connected to the input of a second threshold stage comprising cascaded inverter stages 15 and 16 and a feedback resistor 17. The wiper arm is further connected to the negative side of battery 7 through a diode 23. The two threshold circuits 11, 12 and 13 and 15, 16 and 17 have different threshold values. The threshold values of the first and second threshold stages are adjusted to be symmetrical to the voltage value at the output of the differential amplifier when the bridge circuit is at balance. The first threshold circuit (11,12,13) has the lower threshold value while the second threshold circuit (15,16,17) has the higher threshold value. An inverter 18 is connected to the output of the second threshold stage. The first and second threshold stage are each connected to one input of an AND-gate constituted by a diode 19 and 20. The output of the AND-gate is connected to an inverter 24 whose output is denoted by reference letter E. The output of differential amplifier 9 is also connected to the negative side of the battery through a diode 22.

The output E of inverter 24 is connected to one input of an AND-gate 25 whose other input is connected to the output of an OR-gate 26. The first input of OR-gate 26 is connected to the output of the AND-gate constituted by diodes 19 and 20 while the second input of OR-gate 26 is connected to the output of a further OR-gate 60. OR-gates 60 and 26 are herein referred to as additional logic circuit means. The first input of OR-gate 60 is connected to the output of the first threshold circuit, while the second input of this OR-gate is connected through a resistor 29 to the positive side of battery 7 and through a switch 27 to the negative side of battery 27. Switch 27 is coupled to diaphragm 28 which controls the quantity of light falling on light-sensitive element 1 in such a manner that this switch is open until the diaphragm reaches its fully open position. At this point switch 27 is closed.

The output of AND-gate 25 is connected to a terminal H. It is further connected to the input of a pulse generator 30 which comprises an inverting bistable stage 30 and a timing circuit comprising a resistor 31 and a capacitor 32. The output of this pulse generator is connected to a terminal F. The pulses at terminal F are used to energize the windings of a stepmotor as will be explained below. Further, terminal D, that is the output of inverter 18, is connected to a terminal G. The potential at terminal G controls the direction of rotation of stepmotor 33 (see FIG. 2).

Figure 2:
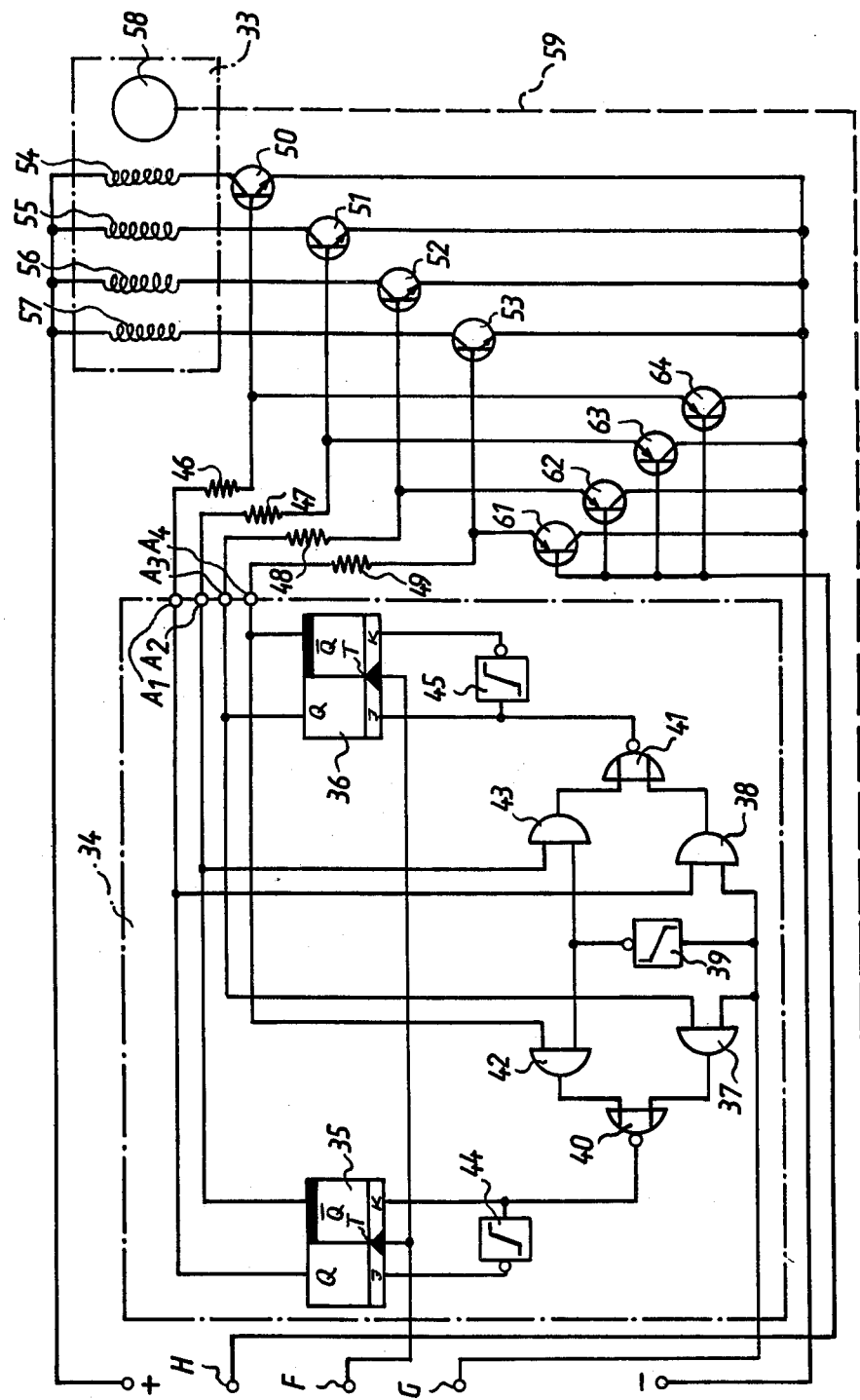

As shown in FIG. 2, the terminal F is connected to one input (the clock input) of a counter 34 which is a forward-reverse counter. The counter comprises a first master-slave flip-flop 35 and a second master-slave flip-flop 36. The clock inputs T of both of these flip-flops are connected to the above-mentioned terminal F.

Terminal G is connected to the first inputs of AND-gates 37 and 38. Further, terminal G is connected to the input of an inverting bistable stage 39. The second input of AND-gate 37 is connected to the Q output of flip-flop 36 while the second input of AND-gate 38 is connected to the Q output of flip-flop 35. The output of AND-gate 37 is connected to the first input of a NOR-gate 40 whose output is connected to the K input of flip-flop 35 and through an inverting bistable stage 44 to the J input of flip-flop 35. Similarly, the output of AND-gate 38 is connected to one input of a NOR-gate 41 whose output is directly connected to the J input of flip-flop 36 and through an inverting bistable stage 45 to the K input of flip-flop 36. The second input of NOR-gate 40 is connected to the output of an AND-gate 42 while the second input of NOR-gate 41 is connected to the output of an AND-gate 43. The first inputs of AND-gates 42 and 43 are connected to the output of the inverting bistable stage 39. The second input of AND-gate 42 is connected to the Q output of flip-flop 36 while the second input of AND-gate 43 is connected to the Q output of flip-flop 35. The Q, Q outputs of flip-flops 35 and 36 constitute the counting outputs. The counting output signals herein referred to are the signals occurring simultaneously at these counting outputs which are labelled A1, A2, A3 and A4 in FIG. 2.

Terminals A1, A2, A3 and A4 are connected through resistors 46, 47, 48 and 49 respectively to the bases of transistors 50, 51, 52, and 53 respectively. Connected in series with the emitter-collector circuits of the above-mentioned transistors are the energizing windings 54, 55, 56 and 57 respectively of stepmotor 53. Stepmotor 53 has a permanent magnet armature 58. Armature 58 is mechanically coupled by means of a coupling 59 to the diaphragm 28 which is positioned in front of photoresistor 1.

Terminal G is connected to the bases of transistors 61, 62, 63 and 64 whose collector-emitter circuits are connected in parallel, each to the corresponding one of the base-emitter circuits of transistors 50-53.

The above-described construction of counter 34 causes the signals at outputs A1, A2, A3 and A4 to be combinations in which two of the outputs are always energized, while two of the outputs are deenergized for any one counting signal. The signals appearing at outputs A1-A4 have the following voltage combinations for one direction of rotation:

(1) 1001;
(2) 1010;
(3) 0110; and
(4) 0101.

For the other direction of rotation of course the sequence would be reversed.

The above-described arrangement operates as follows:

First let it be assumed that the bridge circuit is in balance in such a direction that the voltage at output C of the operational amplifier is so low that the threshold value of neither the first nor the second threshold circuit is exceeded. In this case the potential at terminal E is 1. AND-gate 25 furnishes a 1 output since the signal is also present at its second input. The second input signal of course is derived through OR-gate 26 and OR-gate 60 from the positive output of battery 7 since switch 27 is open. The pulse generator is energized and a sequence of pulses appears at terminal F. This causes the forward-reverse counter 34 to start counting. The direction of counting is determined by the signal at terminal G which is derived from terminal D. This terminal under the aforementioned conditions carries a 1 potential. The potential at terminal H is also 1, so that transistors 61–64 are blocked. Transistors 50–53 are thus switched to the conductive state in accordance with the signals appearing at terminals A1–A4, thereby energizing the windings 54-57 in accordance with the counting output signals.

Shortly before the bridge is balanced, the threshold value of the first threshold circuit is exceeded. Under these conditions the potential at terminal E of inverter 24 is a "0" potential and AND-gate 25 is blocked. Thus the pulse generator is deenergized and terminal H furnishes a "0" potential to the bases of all transistors 61-64. This causes transistors 50-53 to be blocked. All energizing windings 54-57 of stepmotor 33 are therefore deenergized.

As long as switch 27 is open, the output of OR-gate 26 furnishes a "1" potential. OR-gate 60 also furnishes a "1" potential, since a "1" potential is supplied to one of its input since switch 27 is open. The output of OR-gate 60 is thus independent of the absence or presence of the threshold output signal from the first threshold stage, that is it is independent of the potential appearing at the output of inverter 12. If now the brightness decreases to such an extent it is impossible to reestablish bridge balance, switch 27 is closed when diaphragm 28 has reached its maximum opening. Of course while the diaphragm is being regulated in the opening direction, the output signal of the first threshold circuit is a "0" signal. Thus if switch 27 closes and a "0" signal is applied to the other input of OR-gate 60, this OR-gate will also furnish a "0" output. Since at this point the AND-gate comprising diodes 19 and 20 also furnishes a "0" signal, the output of OR-gate 26 will also be a "0" signal. Thus the output of AND-gate 25 will be a "0". This output of AND-gate 25 is herein referred to as the absence of a logic output signal. When the output of AND-gate 25 is a "0" signal of course the signal at terminal H is also "0" as is the signal at terminal F. Thus transistors 50-53 are blocked.

Figure 3:
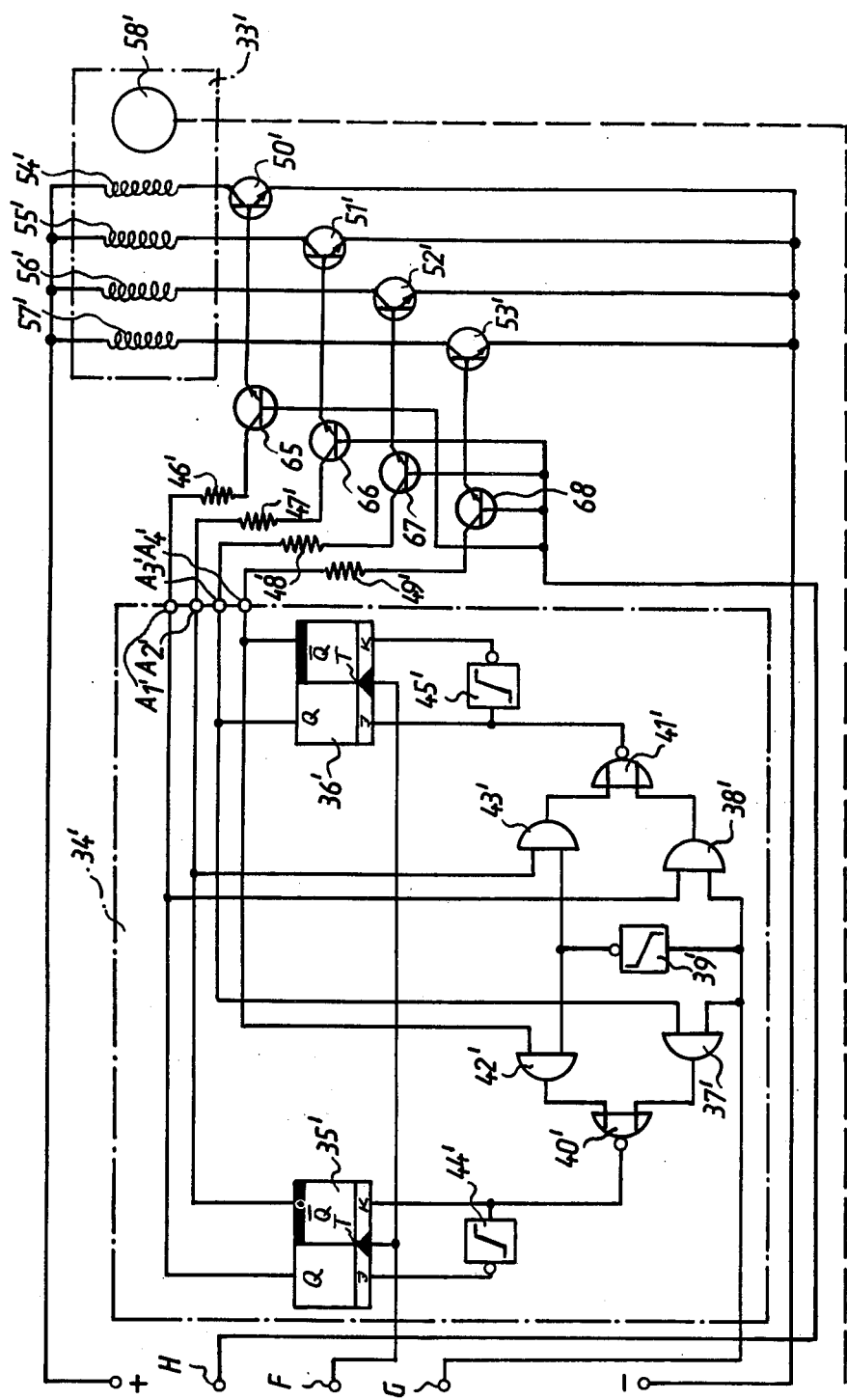
FIG. 3 is a second embodiment of the present invention.
Figure 4:
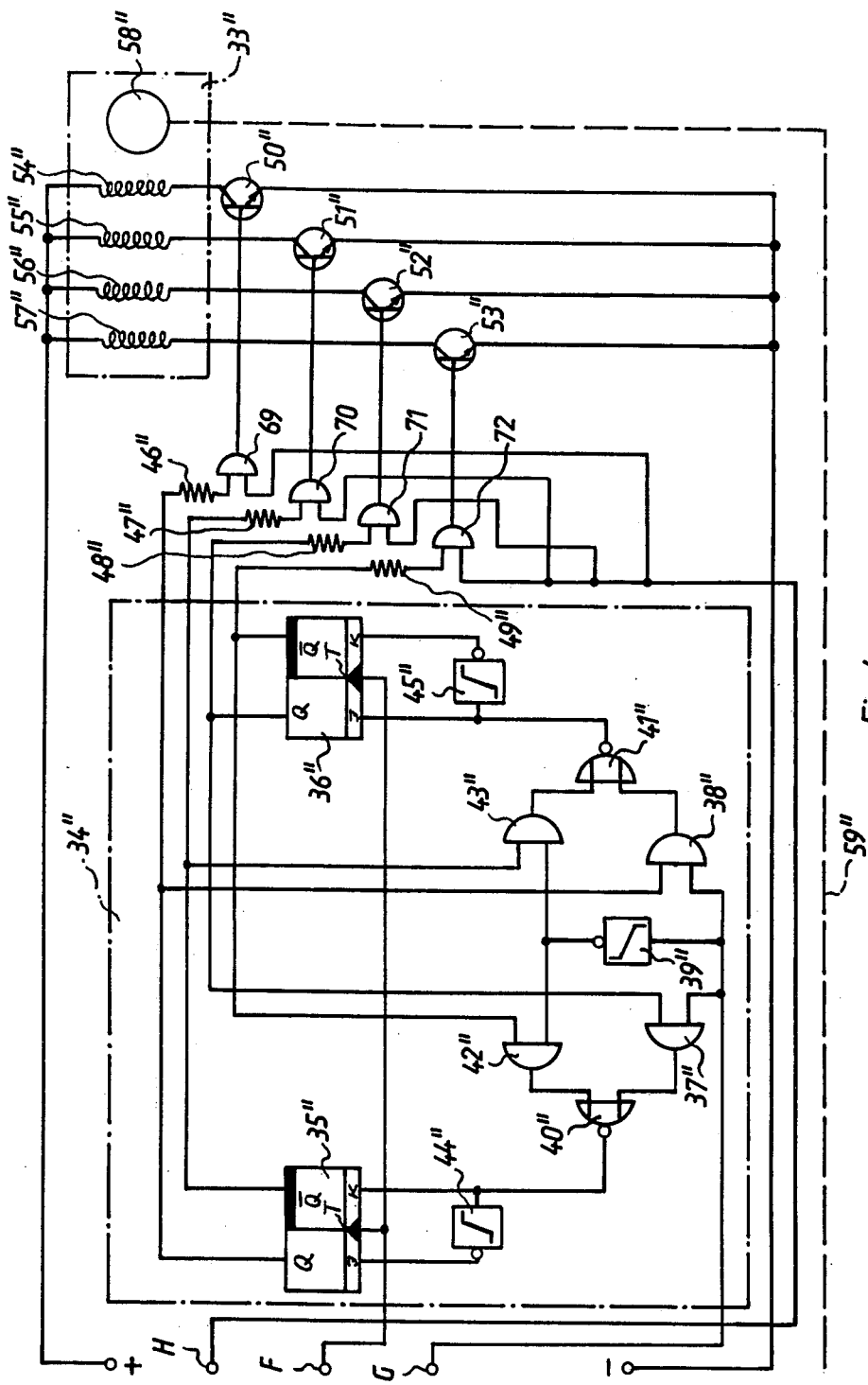
FIG. 4 is a third embodiment of the present invention.

It should further be noted that as indicated at H' in FIG. 1, the terminal H in any of FIGS. 2-4 could also be connected to the output of the pulse generator rather than to its input as shown in the full lines. Under these circumstances even a greater power savings occurs since the windings will also be deenergized between pulses.

It should further be noted that the above-mentioned decrease in illumination to a point where switch 27 is operated may occur when no light at all reaches light-sensitive element 1 because, for example, a cap has been put on the camera since it will not be in use but the camera is still connected to the source of energy.

If now the cap is removed and the light-sensitive element is again exposed to light, the amount of light falling on light-sensitive element 1 must be at least sufficiently high that the bridge can be balanced for the largest diaphragm opening. In this case the threshold value of the first threshold stage is just passed, so that OR-gate 60 again furnishes a "1" potential to OR-gate 26. AND-gate 25 just receives a "1" potential at its second input. If the light increases to such an amount that the diaphragm opening is to be decreased, the second input of AND-gate 25 receives a "1" signal. The pulse generator is again energized and the blocking of transistors 50-53 by means of transistors 61-64 is stopped.

An alternate embodiment of the circuitry of FIG. 2 is shown in FIG. 3. Corresponding elements in the two Figures have the same reference numerals. The difference between the circuitry of FIG. 3 and that of FIG. 2 is the arrangement of transistors for blocking the transistors 50-53. Specifically, transistors 65, 66, 67 and 68 each have an emitter-collector circuit connected in the base circuit of the corresponding one of transistors 50-53. The bases of transistors 65-68 are connected in common to terminal H. A "0" signal applied to the bases of transistors 65-68 causes these transistors to block in turn causing transistors 50-53 to block.

A further alternate embodiment of the circuit of FIG. 2 is shown in FIG. 4. Again, the same circuit elements have the same reference numerals. In FIG. 4, AND-gates 69-72 are substituted for transistors 65-68 of FIG. 3. Specifically, AND-gates 69-72 have a first input connected in common to terminal H, while the second inputs of AND-gates 69-72 are connected through resistors 46, 47, 48 and 49, respectively to terminals A1-A4 of counter 34. Outputs of AND-gates 69-72 are connected to respective ones of the bases of transistors 50-53. Since each AND-gate will furnish an AND-gate output signal only in the presence of a "1" potential at terminal H, all transistors 50-53 will be blocked in the absence of such a signal.

It is seen by the above-described preferred embodiments that the present invention causes the regulating system for the diaphragm of a photographic camera to be substantially free of hunting about the balance point, to prevent damage to the diaphragm element due to forces applied after it has reached its extreme position and to be extremely low in power consumption.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In an exposure-light-intensity control system, in combination,
an adjustable diaphragm;
a stepper motor having an output coupled to the diaphragm for adjusting the diaphragm setting, the stepper motor having a plurality of successively energizable windings, the stepper motor being capable of changing the diaphragm setting within arrange of settings bounded by a first extreme setting and a second extreme setting;
motor-control circuit means connected to the stepper motor windings, and having an enablement-signal input for receipt of an enablement signal commanding that the stepper motor operate, and having a direction-signal input for receipt of a direction signal indicating the direction in which the stepper motor is to operate, the motor-control circuit means being operative for preventing stepper motor operation in the absence of an enablement signal irrespective of the presence of a direction signal, and being operative in the presence of an enablement signal for causing the stepper motor to operate in the direction indicated by the direction signal;
photosensitive means operative for generating an actual-value signal corresponding to the intensity of light actually passing through the diaphragm;
reference means operative for generating a desired-value signal indicating a reference value for the intensity of light passing through the diaphragm;
differential amplifier means having inputs connected to receive the actual-value and desired-value signals and having an output, and operative for producing at its output an error signal indicating the sense and the amount of the discrepancy between the actual-value and desired-value signals, the error signal having a predetermined intermediate value when the discrepancy between the actual-value and desired-value signals is zero;

first and second bistable threshold circuits, each having an input and an output, the inputs of the threshold circuits being connected to receive the error signal, the first threshold circuit producing an output signal when the error-signal amplitude exceeds a predetermined first threshold value lower than said intermediate value, the second threshold circuit producing an output signal when the error-signal amplitude exceeds a predetermined second threshold value higher than said intermediate value, said first and second threshold values together defining a tolerance range containing said intermediate value, the concurrent absence of both a first threshold-circuit output signal and a second threshold-circuit output signal constituting a first signal combination, the concurrent presence of both a first threshold-circuit output signal and a second threshold-circuit output signal constituting a second signal combination;

extreme-setting detector switch means operative for generating an extreme-setting signal indicating that the diaphragm has been brought to an extreme setting;

evaluating circuit means operative for causing the stepper motor to change the diaphragm setting in the direction towards said first extreme setting in response to said first signal combination and in the direction towards said second extreme setting in response to said second signal combination, said first extreme setting being associated with said first signal combination, said second extreme setting being associated with said second signal combination, said evaluating circuit comprising direction-signal furnishing means having an input connected to the output of at least one of the two threshold circuits and having an output connected to the direction-signal input of the motor-control circuit, and logic circuit means comprising a plurality of interconnected logic gates, the logic circuit means having an output connected to the enablement-signal input of the motor-control circuit means and operative for alternatively applying or not applying an enablement signal to the enablement-signal input, the logic circuit means having inputs connected to the first threshold circuit, the second threshold circuit and the extreme-setting detector switch means, the logic circuit means being operative for distinguishing among the following distinct situations:
(a) absence of extreme-setting signal, plus absence of first threshold-circuit output signal, plus absence of second threshold-circuit output signal,
(b) absence of extreme-setting signal, plus presence of first threshold-circuit output signal, plus absence of second threshold-circuit output signal,
(c) absence of extreme-setting signal, plus presence of first threshold-circuit output signal, plus presence of second threshold-circuit output signal,
(d) presence of extreme-setting signal, plus presence of the one said first and second signal combinations associated with the extreme setting corresponding to the extreme-setting signal,
(e) presence of extreme-setting signal, plus presence of first threshold-circuit output signal, plus absence of second threshold-circuit output signal,
(f) presence of extreme-setting signal, plus presence of the one of said first and second signal combinations not associated with the extreme setting corresponding to the extreme setting signal, the logic circuit means being operative for applying an enablement signal to the enablement-signal input of the motor-control circuit means in response to any one of situations (a), (c) and (f), but withholding an enablement signal from the enablement-signal input in response to any one of situations (b), (d) and (e).

2. The system defined in claim 1, said extreme-setting detector switch means consisting of means operative for generating an extreme-aperture-setting signal for only one of the two extreme settings of the diaphragm.

3. The system defined in claim 1, said direction-signal furnishing means comprising means having an input connected to the output of only one of the two threshold circuits and operative for applying either a first-direction or a second-direction signal to the direction-signal input of the motor-control circuit means exclusively in dependence upon the presence or absence of an output signal from said one of the two threshold circuits.

* * * * *